United States Patent
Canning et al.

[11] Patent Number: 6,014,490
[45] Date of Patent: Jan. 11, 2000

[54] OPTICAL FIBER INTERCONNECTION CLOSURE HAVING A FIBER MANAGEMENT FRAME

[75] Inventors: Michael W. Canning, Dallas; Kevin L. Strause, Keller; Robert A. Burrous, Coppell; Christopher L. Holderness, Granbury, all of Tex.

[73] Assignee: Siecor Operation, LLC, Hickory, N.C.

[21] Appl. No.: 09/092,365

[22] Filed: Jun. 5, 1998

[51] Int. Cl.[7] ...................................................... G02B 6/00
[52] U.S. Cl. .......................... 385/135; 385/134; 385/137
[58] Field of Search .................................... 385/135, 134, 385/136, 137, 138, 139

[56] References Cited

U.S. PATENT DOCUMENTS

| | | | |
|---|---|---|---|
| 5,185,845 | 2/1993 | Jones ........................................ | 385/135 |
| 5,323,480 | 6/1994 | Mullaney et al. ....................... | 385/135 |
| 5,479,553 | 12/1995 | Daems et al. ........................... | 385/135 |

OTHER PUBLICATIONS

Brochure, SIECOR Splice Closures, Siecor Corporation, Sep. 1995.
Brochure, SIECOR FiberManager™ System Access Provisioning Facility (APF), Siecor Corporation, Dec. 1995.
Brochure, SIECOR Patch Closure, Siecor Corporation, Oct. 1996.

*Primary Examiner*—Phan T. H. Palmer

[57] ABSTRACT

The optical fiber interconnection closure includes a housing defining an internal cavity and a fiber management frame disposed within the internal cavity. The fiber management frame includes a plurality of partitions for dividing the internal cavity into at least one and, more commonly, a plurality of slack storage compartments and a fiber interconnection compartment. The slack storage compartments are adapted to store slack lengths of optical fiber, while the fiber interconnection compartment is adapted to receive end portions of the optical fibers from the slack storage compartment such that the optical fibers can be interconnected therein. More particularly, one slack storage compartment can store slack lengths of unspliced express optical fibers, while another slack storage compartment can store slack lengths of the optical fibers that are spliced within the closure.

32 Claims, 8 Drawing Sheets

OPTICAL FIBER INTERCONNECTION CLOSURE HAVING A FIBER MANAGEMENT FRAME

FIELD OF THE INVENTION

The present invention relates generally to optical fiber interconnection closures and, more particularly, to optical fiber interconnection closures having an internal frame for appropriately organizing and the routing optical fibers within the closure.

BACKGROUND OF THE INVENTION

Fiber optic networks typically include interconnection closures at various splice locations throughout the fiber optic network. Typically, these interconnection closures include splice closures and patch closures. For example, splice closures commonly house the splices required to connect the optical fibers of one or more distribution cables to respective ones of the optical fibers of a fiber optic feeder cable. By housing the splices, a splice closure protects the spliced end portions of the optical fibers from environmental degradation, strain and other deterious forces, thereby increasing the reliability and quality of the splices.

As known to those skilled in the art, a variety of splice closures have been designed. For example, a typical butt-type splice closure includes a housing open at one end and a single end cap positioned within the open end of the housing through which each of the fiber optic cables extend. In addition, in-line splice closures include a housing open at both opposed ends and a pair of end caps positioned within the open ends of the housing such that fiber optic cables can enter the in-line splice closure from either end of the housing.

Regardless of the type, conventional splice closures generally include a number of splice trays that are disposed in a stacked arrangement within the housing. Each splice tray generally includes a series of splice holders for receiving the spliced end portions of a pair of optical fibers. In some instances, the splice trays are pivotally connected at one end to a mounting bracket which, in turn, is connected to an end cap. This pivotal connection permits the splice trays to be temporarily moved to a raised position in order to access an underlying splice tray so as to facilitate reconfiguration of the splicing connections. See, for example, U.S. Pat. No. 5,323,480 to Julian S. Mullaney, et al. and U.S. Pat. No. 5,479,553 to Daniel F. Daems, et al. In other instances, the splice trays are not hinged, but are stacked in a tray stacker such that each tray is accessible.

While splice closures that include a number of stacked splice trays are widely utilized throughout conventional fiber optic networks, these conventional splice closures suffer from several deficiencies. By including multiple splice trays, for example, the number of parts required to construct the splice closure as well as the attendant costs of the parts and the labor to assemble the parts can be significant. In addition, structures having moving parts, such as a splice closure having hingedly connected splice trays, are generally more prone to reliability problems than similar structures which do not have moving parts.

In addition to a plurality of splice trays, conventional splice closures generally include a slack storage tray or basket in which slack lengths of the various optical fibers are stored generally in a coiled or looped configuration. These optical fibers can include both the optical fibers that are to be spliced within the splice closure and express optical fibers that extend unspliced through the splice closure. While a splice closure that contains slack lengths of the optical fibers facilitates subsequent reconfiguration and resplicing of the various optical fibers, slack lengths of the optical fibers stored within the slack storage tray often become tangled, thereby rendering it relatively difficult to identify and disentangle a particular optical fiber. As a result of the relatively poor fiber management provided by the slack storage trays of conventional splice closures, it is therefore generally time consuming to identify and access a specific one of optical fibers within a splice storage tray in order to reconfigure or resplice the optical fibers.

As known to those skilled in the art, fiber optic cables that include one or more ribbon fibers are being increasingly utilized, especially for fiber to the desk and other like applications. Conventional ribbon fibers include four, eight, twelve, sixteen or twenty-four optical fibers connected by a ribbon matrix. While conventional splice closures can be utilized to splice ribbon fibers as well as loose buffered optical fibers, conventional splice closures suffer from additional deficiencies when utilized to splice ribbon fibers. In this regard, the coiling of slack lengths of the ribbon fibers within the slack storage tray can quickly fill the slack storage tray. Like individual optical fibers, slack lengths of the ribbon fibers also generally become entangled within the slack storage tray such that it is relatively difficult to identify and extract a specific ribbon fiber, such as for future reconfiguration of the fiber optic network. In addition, fiber optic cables that include ribbon fibers oftentimes have large fiber counts, thereby requiring a large number of splice trays and, in turn, a disadvantageously large closure.

SUMMARY OF THE INVENTION

As described below, the optical fiber interconnection closure of the present invention addresses the deficiencies identified with conventional closures. The closure includes a housing defining an internal cavity and a fiber management frame disposed within the internal cavity. The fiber management frame includes a plurality of partitions for dividing the internal cavity into at least one slack storage compartment and a fiber interconnection compartment. The slack storage compartment is adapted to store slack lengths of optical fiber, while the fiber interconnection compartment is adapted to receive end portions of the optical fibers from the slack storage compartment such that the optical fibers can be interconnected therein.

According to one embodiment, the fiber management frame includes partitions which divide the internal cavity of the housing into first and second slack storage compartments and a fiber interconnection compartment. According to this embodiment, the first slack storage compartment is adapted to store slack lengths of unspliced express optical fibers. In contrast, the second slack storage compartment is adapted to store slack lengths of the optical fibers that are interconnected within the closure. As such, the fiber interconnection compartment is adapted to receive end portions of optical fibers from the second slack storage compartment such that the optical fibers can be interconnected therein.

The fiber management frame of the closure of this advantageous embodiment also preferably includes partitions which further divide the internal cavity into a third slack storage compartment that also stores slack lengths of the optical fibers that are spliced within the closure. While the slack storage compartments can be arranged in a variety of manners, the first slack storage compartment of the fiber management frame of one advantageous embodiment is positioned between the second and third slack storage compartments. As such, the fiber interconnection compartment of this embodiment will receive end portions of the optical fibers from the second and third slack storage compartments such that pairs of optical fibers from the second and third slack storage compartments can be interconnected therein.

According to one advantageous embodiment of the closure of the present invention, each slack storage compartment is adapted to store slack lengths of the optical fibers in a coiled configuration that defines a slack storage plane extending generally parallel to the slack lengths of the optical fibers. In the embodiment in which the fiber management frame defines first, second and third slack storage compartments, for example, the slack storage planes defined by the first, second and third slack storage compartments are preferably parallel to one another.

The closure of one embodiment also preferably includes a splice holder disposed within the fiber interconnection compartment for retaining spliced end portions of the optical fibers. The splice holder defines a splice plane extending generally parallel to the spliced end portions of the optical fibers. Preferably, the splice plane defined by the splice holder extends perpendicular to the slack storage planes. As a result of this construction, the fiber management frame of this advantageous embodiment can define a number of different lengthwise extending compartments, such as a plurality of slack storage compartments and a fiber interconnection compartment, in a compact manner.

The partitions of the fiber management frame preferably define respective windows for permitting optical fibers to be routed from one slack storage compartment to another slack storage compartment, thereby facilitating the original configuration and any subsequent reconfiguration of the closure. In addition, the closure can include at least one divider for separating the first slack storage compartment into a plurality of sub-compartments that are each adapted to store slack lengths of unspliced express optical fibers. As a result, the fiber organization provided by the fiber management frame can be even further enhanced by the use of dividers to sub-divide the first slack storage compartment.

According to one advantageous embodiment, the plurality of slack storage compartments and the fiber interconnection compartment are independent of splice trays. As a result, the closure of the present invention generally has fewer parts and is therefore less complex and requires less time to assemble than conventional closures having a plurality of splice trays. As a result of the reduced number of parts and, in particular, the reduced number of moving parts, the reliability of the closure of the present invention is also enhanced.

As a result of the construction of the closure of the present invention, the closure is particularly well-suited for storing slack lengths of ribbon fibers and for interconnecting end portions of the ribbon fibers in an organized manner which also facilitates subsequent reconfiguration of the interconnected fibers. In embodiments in which one or more of the ribbon fibers are to be separated into optical fibers that are then individually spliced, the closure can also include one or more splice trays. In this regard, the fiber management frame can include a mount on which a splice tray is secured for receiving and splicing end portions of one or more optical fibers. Even in this embodiment, however, the closure of the present invention can be initially configured and subsequently reconfigured in a relatively straightforward manner as a result of the organization of the optical fibers and the access to the optical fibers provided by the fiber management frame which divides the internal cavity defined within the housing into a plurality of slack storage compartments and a fiber interconnection compartment, as described above.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
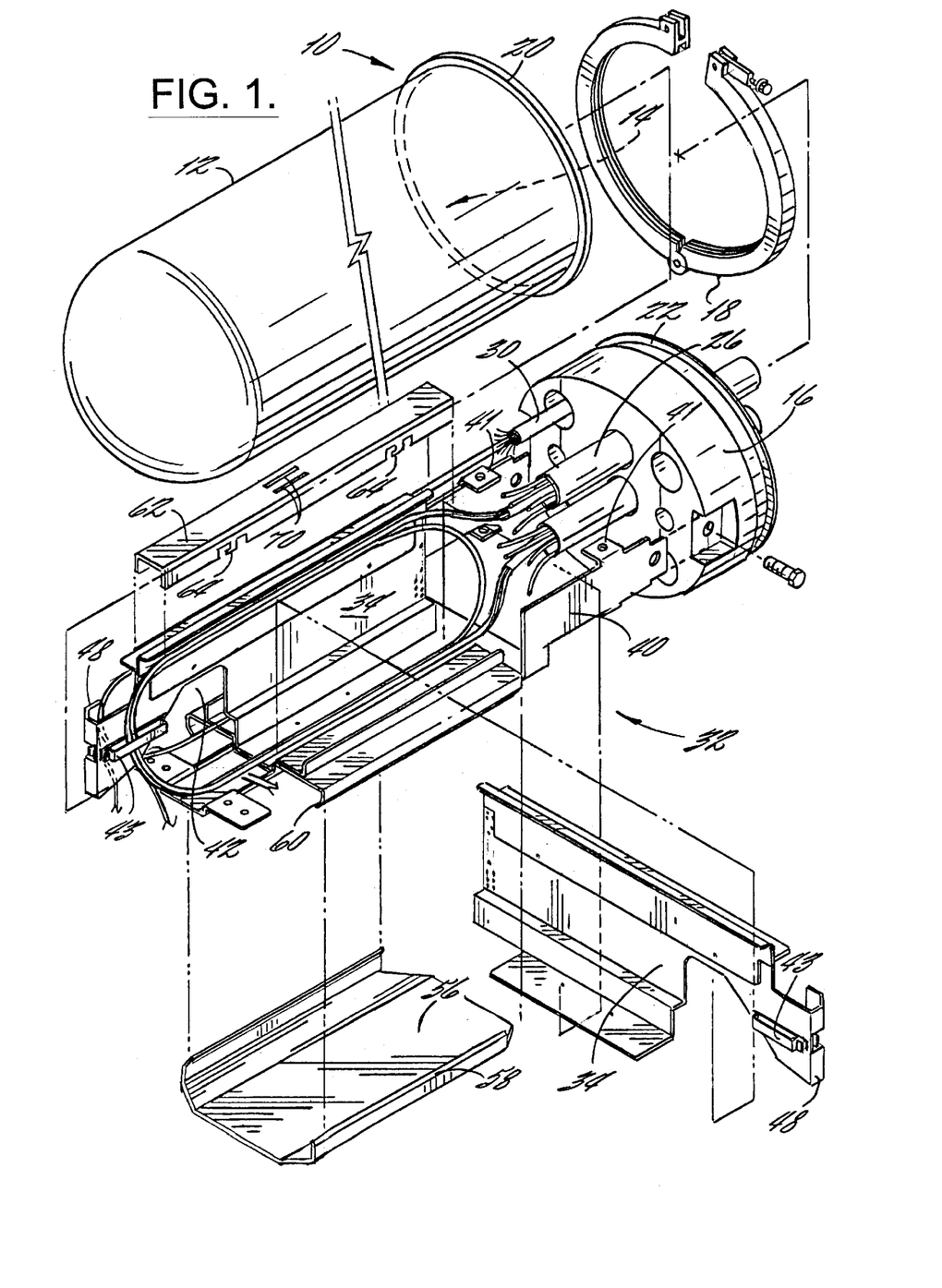
FIG. 1 is an exploded perspective view of an optical fiber interconnection closure according to one advantageous embodiment of the present invention in which the partition which separates the first and second slack storage compartments has been exploded for purposes of illustrated the coiled express fibers within the first slack storage compartment.

Referring now to FIG. 1, an optical fiber interconnection closure 10 according to one advantageous embodiment of the present invention is illustrated. For example, the closure can be either a splice closure or a patch closure. Although the closure of the illustrated embodiment is a butt-type closure, the closure of the present invention can be an in-line closure without departing from the spirit and the scope of the present invention.

As illustrated, the closure 10 includes a housing 12 defining an internal cavity 14. While the housing can have a variety of shapes, the housing of the illustrated embodiment has a generally cylindrical shape that is closed at one end. The closure also generally includes an end cap 16 disposed within the open end of the housing. Although the end cap can be secured to the housing in a variety of manners as known to those skilled in the art, the closure can include an annular collar 18 to securely engage circumferential flanges 20, 22 of the housing and the end cap which extend outwardly therefrom. While the housing and the end cap can be formed of a variety of materials, the housing and the end cap of one advantageous embodiment are formed of a plastic.

Figure 2:
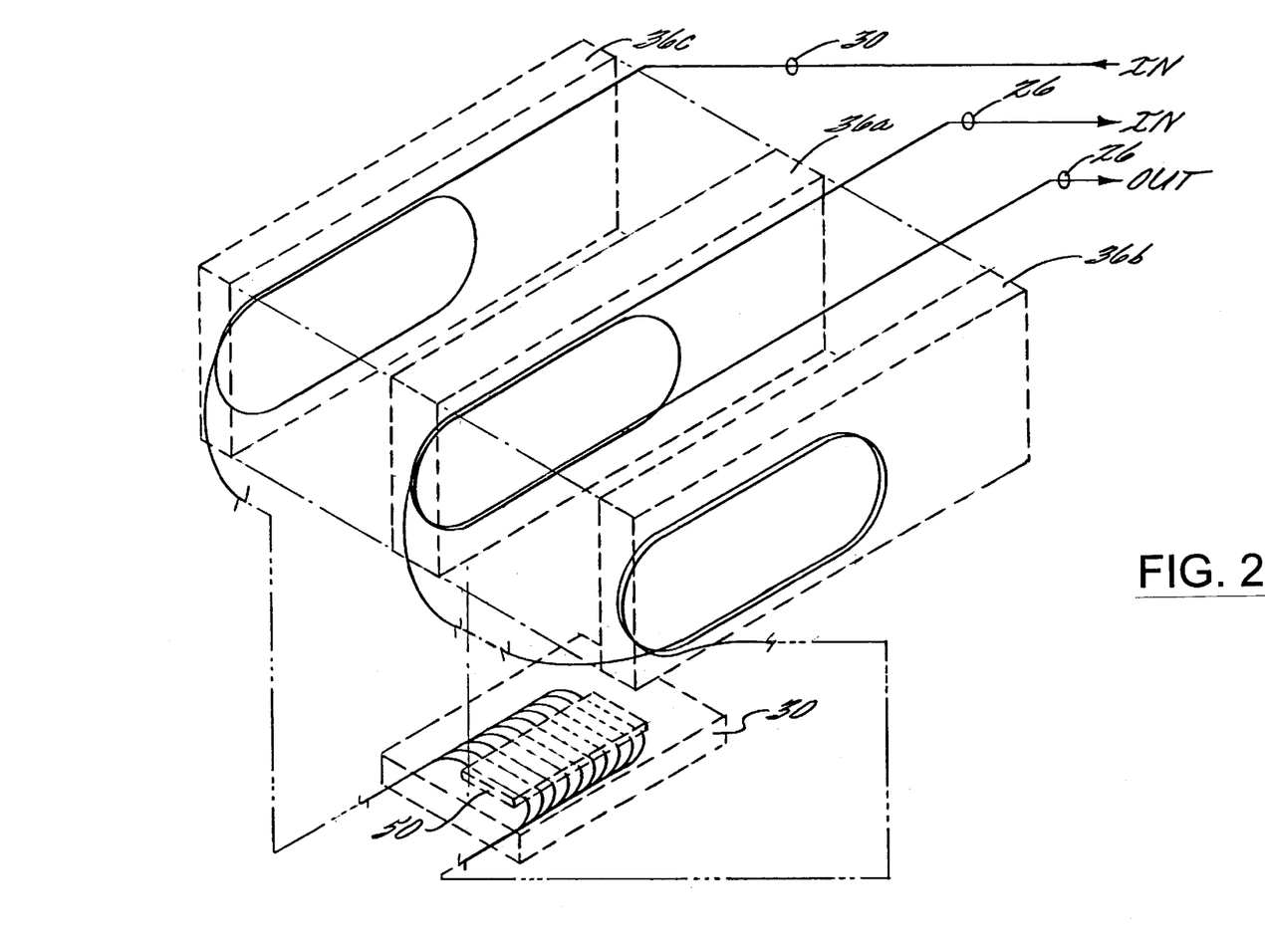
FIG. 2 is a schematic perspective view illustrating fiber routing through the first, second and third slack storage compartments and the fiber interconnection compartment.

As known to those skilled in the art, a center portion of the end cap 16 of a butt-type closure 10 generally defines at least two primary openings 24 through which end portions of first and second fiber optic cables 26 extend. As shown in FIG. 2, the end cap also generally defines one or more secondary openings 28 through which the end portions of other fiber optic cables 30 extend. For example, the two primary openings defined by the end cap can receive end portions of first and second fiber optic feeder cables while the secondary openings defined by the end cap can receive end portions of respective fiber optic distribution cables. As such, one or more of the optical fibers of a fiber optic feeder cable can be spliced to respective optical fibers of a fiber optic distribution cable within the closure, while the remaining optical fibers of the fiber optic feeder cable extend unspliced through the closure between the first and second fiber optic feeder cables. As will be apparent to those skilled in the art, however, the closure and, more particularly, the end cap can be configured to receive and interconnect other combinations of fiber optic cables, if so desired.

In addition to receiving a variety of different types of fiber optic cables, the closure 10 can organize and interconnect different types of optical fibers, such as loose buffered optical fibers and ribbon fiber. As such, the term "optical fiber" as used herein is intended to include all types of optical fibers, including loose buffered optical fibers, optical fibers in the form of a multifiber ribbon or any other subunit of a fiber optic cable. As described below and as illustrated in FIG. 1, however, the closure is particularly well adapted to interconnecting ribbon fiber, such as by splicing.

The closure 10 of the present invention also includes a fiber management frame 32 disposed within the internal cavity 14. The fiber management frame includes a number of partitions 34 for dividing the internal cavity into a plurality of compartments including at least one slack storage compartment 36 and a fiber interconnection compartment 38. The fiber management frame also includes a pair of arms 40 connected to opposed sides of the end cap 16. Although not necessary for the practice of the present invention, the arms can include one or more brackets 41. In order to secure a fiber optic cable to the closure, a cable clamp 45 can be mounted to both the protective jacket of the fiber optic cable and a respective bracket. See, for example, FIG. 5 which illustrates the cable clamp. In order to provide strain relief for the optical fibers of the fiber optic cable the cable clamp can also engage the strength members of a respective fiber.

The partitions 34 of the fiber management frame 32 divide the internal cavity 14 into at least one and, more preferably, a plurality of slack storage compartments 36 as well as a fiber interconnection compartment 38. Preferably, the fiber management frame includes partitions which divide the internal cavity into a first slack storage compartment 36a that stores slack lengths of unspliced express optical fibers and a second slack storage compartment 36b that stores slack lengths of optical fibers that are to be interconnected within the closure 10, such as by splicing.

In the embodiment illustrated in FIGS. 1 and 2, for example, the fiber management frame 32 includes first, second and third slack storage compartments 36a, 36b, 36c with the first slack storage compartment storing slack lengths of unspliced express optical fibers as described below, and the second and third slack storage compartments storing slack lengths of the optical fibers that are interconnected within the closure 10. In order to facilitate interconnection of the optical fibers, the second and third slack storage compartments are preferably positioned on opposite sides of the first slack storage compartment.

As shown schematically in FIG. 2, slack lengths of the express fibers that will continue unspliced through the closure 10 from the first fiber optic feeder cable to the second fiber optic feeder cable can be coiled within the first slack storage compartment 36a in order to provide excess fiber for any subsequent reconfiguration of the fiber optic network. In addition, the second and third slack storage compartments 36b, 36c preferably store slack lengths of the optical fibers of both the fiber optic feeder cables 26 and the fiber optic distribution cables 30 that are to be interconnected within the closure. For example, the optical fibers of the fiber optic feeder cables that are to be interconnected within the closure preferably extend through the first slack storage compartment prior to being directed to one of the second and third slack storage compartments in which slack lengths of the optical fibers are stored in a coiled configuration. Similarly, slack lengths of the optical fibers of the fiber optic distribution cables are also preferably stored in a coiled configuration within the other of the second and third slack storage compartments. While the closure can be adapted to store different lengths of slack optical fiber depending upon the likelihood that the optical fibers will be respliced or otherwise reconnected one or more times, the first, second and third compartments of the closure of one advantageous embodiment preferably store between about two feet and twelve feet of slack for most optical fibers.

In addition to segregating the slack lengths of optical fibers between the unspliced express optical fibers and the optical fibers that are to be interconnected within the closure 10, the fiber management frame 32 provides a variety of other features for further organizing the optical fibers, thereby facilitating the initial configuration of the closure as well as any subsequent reconfiguration of the optical fibers within the closure. As shown in FIG. 1, the fiber management frame preferably includes clips 43 or other types of retainers for securing the slack lengths of optical fibers within respective ones of the slack storage compartments 36. In addition, the partitions 34 preferably define a number of openings for receiving ties, straps or the like which can secure at least some of the optical fibers to the partitions.

Figure 4:
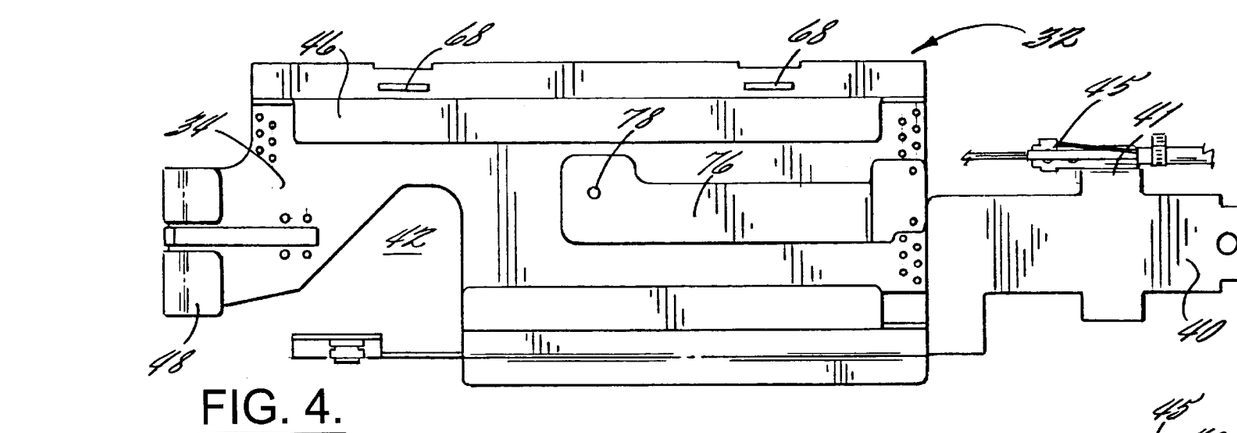
FIG. 4 is a side view of the fiber management frame of the closure of FIG. 1 which illustrates the triangularly shaped openings defined by the partitions.

The partitions 34 which separate the first slack storage compartment 36a from the second and third slack storage compartments 36b, 36c also preferably define windows 42, such as the triangularly shaped window illustrated in FIGS. 1 and 4, to permit access to the optical fibers within the first slack storage compartment such that optical fibers can be drawn from the first slack storage compartment to either the second or third slack storage compartment. Further, the partitions which separate the first slack storage compartment from the second and third slack storage compartments also preferably define respective channels 44 which open into the second and third slack storage compartments for facilitating the routing of optical fibers from the first slack storage compartment to either the second or third slack storage compartments.

During the initial configuration of the closure 10, optical fibers of the fiber optic feeder cables 26 that are to be interconnected within the closure can therefore be routed through the window 42 from the first slack storage compartment 36a to either of the second or third slack storage compartments 36b, 36c in which slack lengths of the optical fibers are stored. See, for example, the optical fiber extending through the window defined by the partition 34 in FIG. 1. In addition, the closure can be more readily reconfigured by accessing slack lengths of one or more of the optical fibers stored within the first slack storage compartment which were previously unspliced, but which are now to be spliced or otherwise interconnected. As such, these optical fibers can be drawn through the windows defined by the partitions into the second or third slack storage compartments which, in turn, feed the end portions of the optical fibers into the fiber interconnection compartment 38 as described below.

Figure 3:
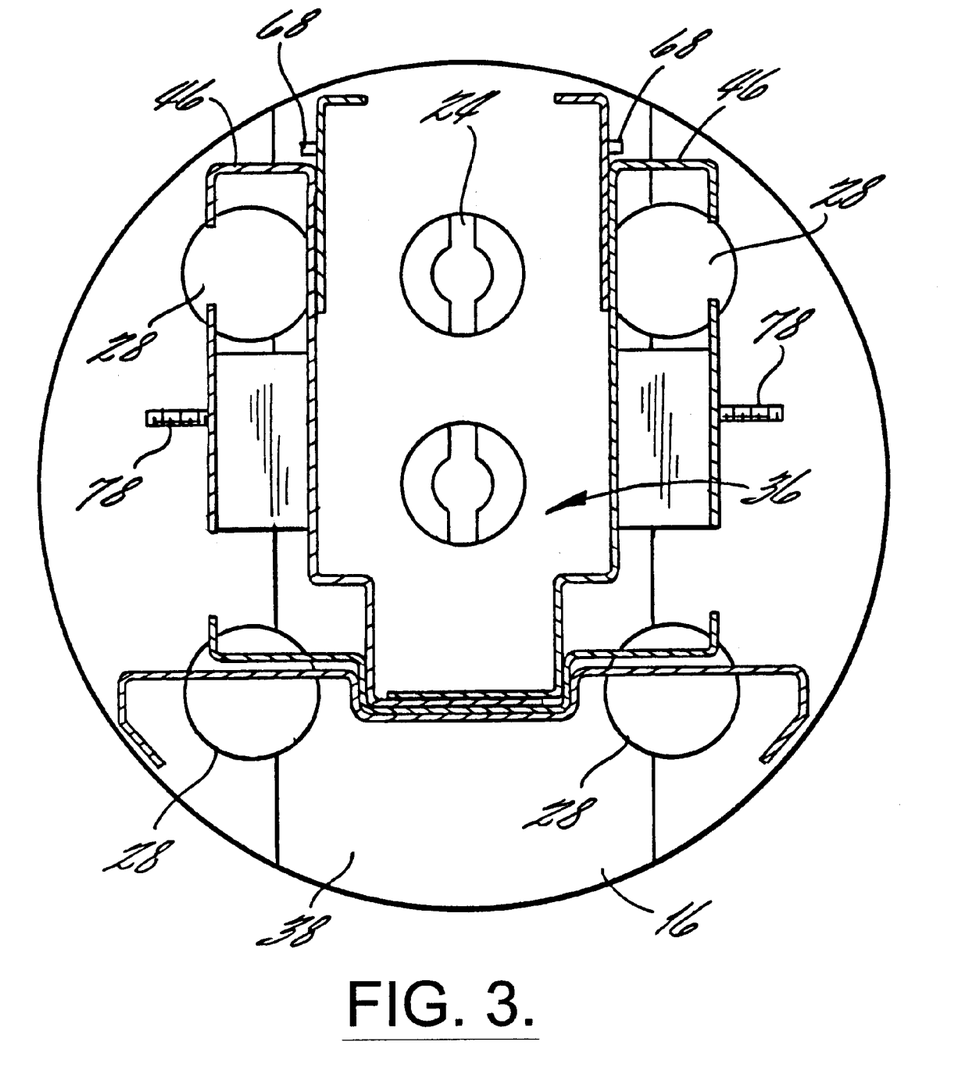
FIG. 3 is cross-sectional view of the fiber management frame and the end cap of the closure of FIG. 1.
Figure 5:
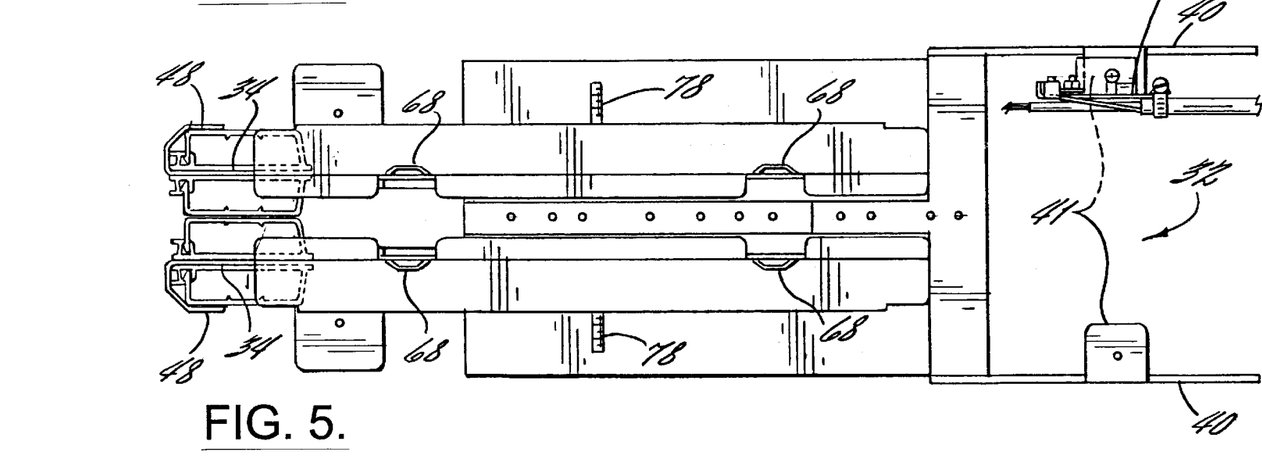
FIG. 5 is a top view of the fiber management frame of the closure of FIG. 1 which illustrates the cable clamp for securing a fiber optic cable to the fiber management frame.

As illustrated in FIGS. 1 and 5, the partitions 34 generally extend lengthwise through the internal cavity 14 defined by the housing 12. However, the opposed ends of the lengthwise extending slack storage compartments 36 are generally open to facilitate insertion of the optical fibers, routing of the optical fibers from one slack storage compartment to another, and access to the optical fibers for reconfiguration purposes. In addition, the second and third slack storage compartments 36b, 36c are separated from the first slack storage compartment 36a by the lengthwise extending partitions, but are otherwise relatively open. In order to retain the slack lengths of the optical fibers within the second and third slack storage compartments, the partitions that separate the second and third slack storage compartments from the first slack storage compartment preferably include a number of tabs 46 and fingers 48 or the like. As shown in FIGS. 3 and 4, for example, a pair of inwardly projecting tabs extend lengthwise along opposed edges of the partitions and a pair of fingers extend inward from one end of the partitions so as to retain the coiled optical fibers within the second and third slack storage compartments.

The end portions of respective pairs of the optical fibers coiled within the second and third slack storage compartments 36b, 36c are preferably interconnected within the fiber interconnection compartment 38. For example, the end portions of respective pairs of the optical fibers coiled within the second and third slack storage compartments can be spliced within the fiber interconnection compartment, such as by fusion splicing, mechanical splicing or any other splicing technique known to those skilled in the art. In this exemplary embodiment, the end portion of an optical fiber coiled within the second slack storage compartment is generally spliced to the end portion of a respective optical fiber coiled within the third slack storage compartment. Thus, an optical fiber from one of the fiber optic feeder cables 26 can be effectively spliced to an optical fiber of a fiber optic distribution cable 30. See FIG. 2. In order to protect the spliced connection, the spliced end portions can be disposed within a heat shrink protective tube or the like as known to those skilled in the art.

Once the end portions of the optical fibers have been spliced, the spliced connection is housed within the fiber interconnection compartment 38. In this regard, the closure 10 of this embodiment preferably includes a splice holder 50 disposed within the fiber interconnection compartment for retaining the spliced end portions of the optical fibers. Although the closure of the present invention can include a variety of splice holders, the splice holder of one embodiment includes a number of flexible ribs arranged in pairs so as to define a splice seat therebetween. The ribs are preferably spaced in a parallel fashion such that the splice seat defined by each pair of ribs can receive and engage a respective protective tube which surrounds the spliced end portions of a pair of optical fibers.

While the spliced connections can be held by a single splice holder 50, the closure 10 can include a plurality of splice holders, such as a pair of splice holders arranged side-by-side for holding respective ones of the spliced connections. By positioning the splice holders such that the splice seats defined by one splice holder are staggered or offset from the splice seats defined by the other splice holder, the number of spliced connections retained by a pair of splice holders can be increased, thereby effectively permitting the fiber count of the closure to be increased without increasing the size of the closure. In addition, by offsetting the splice holders, the optical fibers that are spliced by spliced connections held by one splice holder can conveniently extend between the splice seats and, therefore, between the ribs of the other splice holder.

Figure 6:
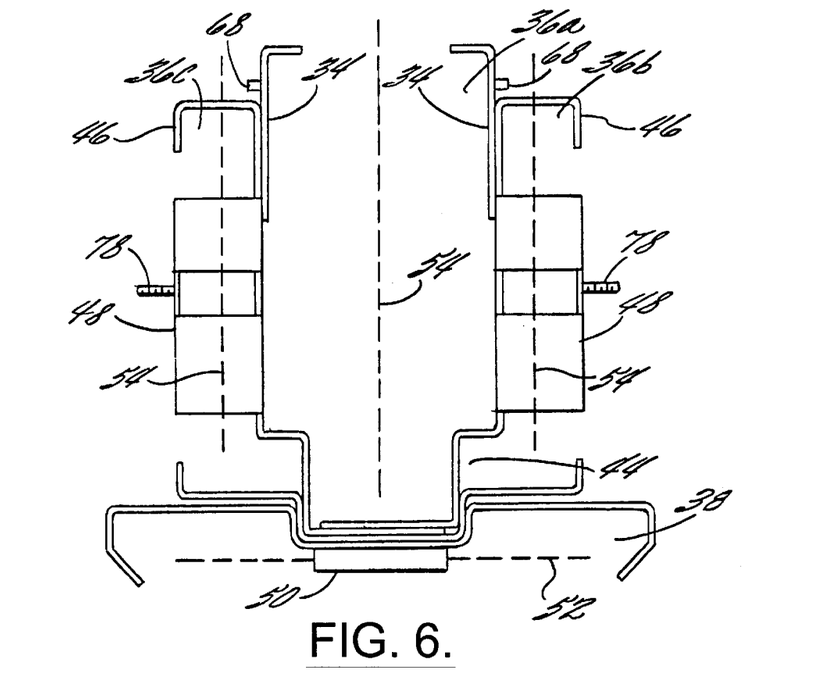
FIG. 6 is a schematic end view illustrating the slack storage planes and the splice plane established by the fiber management frame of the closure of FIG. 1.

As shown schematically in FIG. 6, each splice holder 50 preferably defines a splice plane 52 extending generally parallel to the spliced end portions of the optical fibers. In addition, each slack storage compartment 36 preferably stores slack lengths of the optical fibers in a coiled configuration which defines a respective slack storage plane 54 extending generally parallel to the slack lengths of the optical fibers. As also shown schematically in FIG. 6, the slack storage planes of the first, second and third slack storage compartments 36a, 36b, 36c are preferably parallel to each other, but perpendicular to the splice plane defining by the splice holder. As a result of this construction, the fiber management frame 32 of the closure 10 of the present invention can define a plurality of slack storage compartments and a fiber interconnection compartment 38 in a relatively compact manner, while facilitating routing of the optical fibers between the various compartments in an organized fashion.

Figure 8:
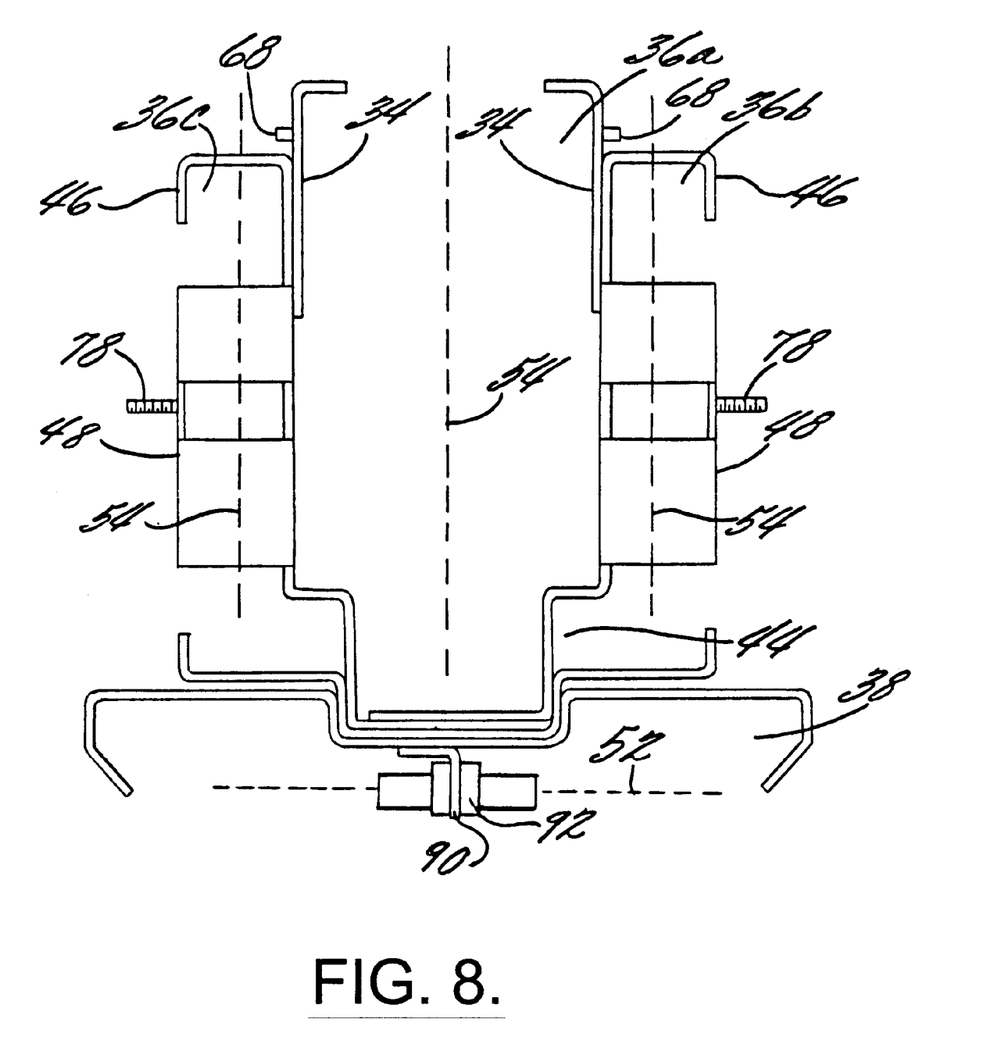
FIG. 8 is a schematic end view illustrating another embodiment of the closure of the present invention which includes a number of fiber adapters for facilitating the interconnection of a number of connectorized optical fibers.

As shown in FIG. 8, the closure 10 of another embodiment can be a patch closure which permits the interconnection of a plurality of connectorized optical fibers within the fiber interconnection compartment 38. For example, the fiber interconnection compartment can include a lengthwise extending adapter bracket 90 having an L-shape in lateral cross-section. The adapter bracket can hold a number of fiber adapters or sleeves 92 spaced lengthwise along the bracket. By inserting the connectorized end portions of a pair of optical fibers into the opposed ends of a fiber adapter, the pair of optical fibers can therefore be interconnected.

Figure 7:
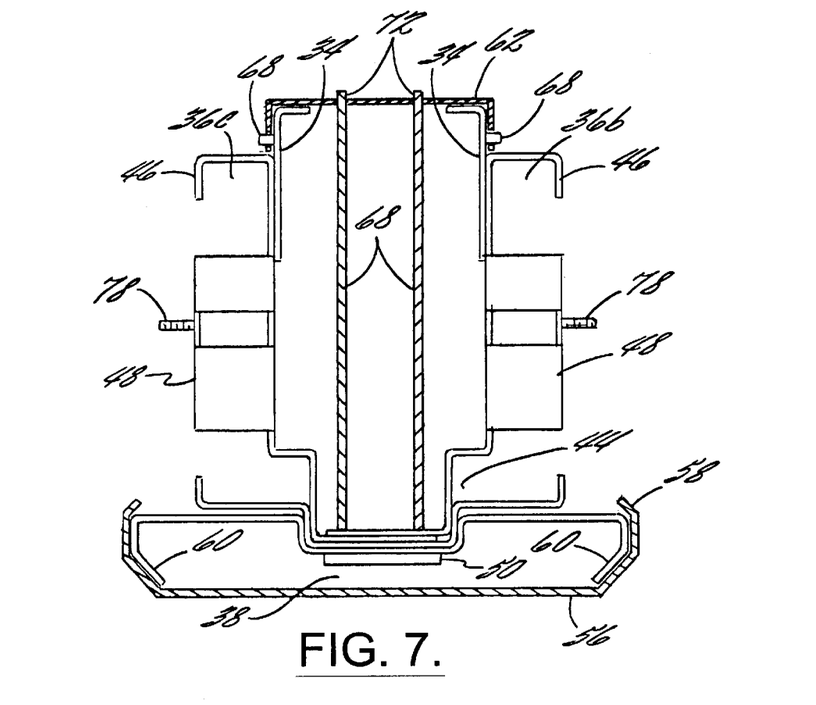
FIG. 7 is an end view of a fiber management frame of another embodiment of the present invention which includes a pair of dividers for subdividing the first slack storage compartment.

As shown in FIGS. 1 and 7, the fiber management frame 32 can also include a cover 56 for covering the fiber interconnection compartment 38 in order to limit access to the fiber interconnections, such as the spliced connections. The cover is preferably detachably mounted to the remainder of the fiber management frame such that the cover can be readily removed to facilitate reconfiguration of the optical fibers. For example, the lengthwise extending edges 58 of the cover can be angled inwardly so as to snap over corresponding lengthwise extending edges 60 of the fiber interconnection compartment. In addition, the lengthwise extending edges of the cover and the fiber interconnection compartment are preferably sufficiently compliant that the cover can be readily removed if the optical fibers are to be reconfigured. It is noted, however, that the embodiment of the closure 10 which serves as a patch closure generally does not include a cover for the fiber interconnection compartment.

The fiber management frame 32 of the present invention can also include another cover 62 for restricting access to the first slack storage compartment 36a. This other cover extends between the pair of partitions 34 which define the first slack storage compartment. See FIGS. 1 and 7. As described in conjunction with the cover for the fiber interconnection compartment, the cover for the first slack storage compartment is preferably removably mounted to the partitions to prevent inadvertent access or damage to the slack lengths of express fiber coiled within the first slack storage compartment. Although the cover for the first slack storage compartment could be removably mounted in a variety of manners, the cover of one advantageous embodiment includes a number of L-shaped fingers 64 adapted to engage corresponding U-shaped tabs 68 extending outwardly from the partitions which define the first slack storage compartment.

Figure 10:
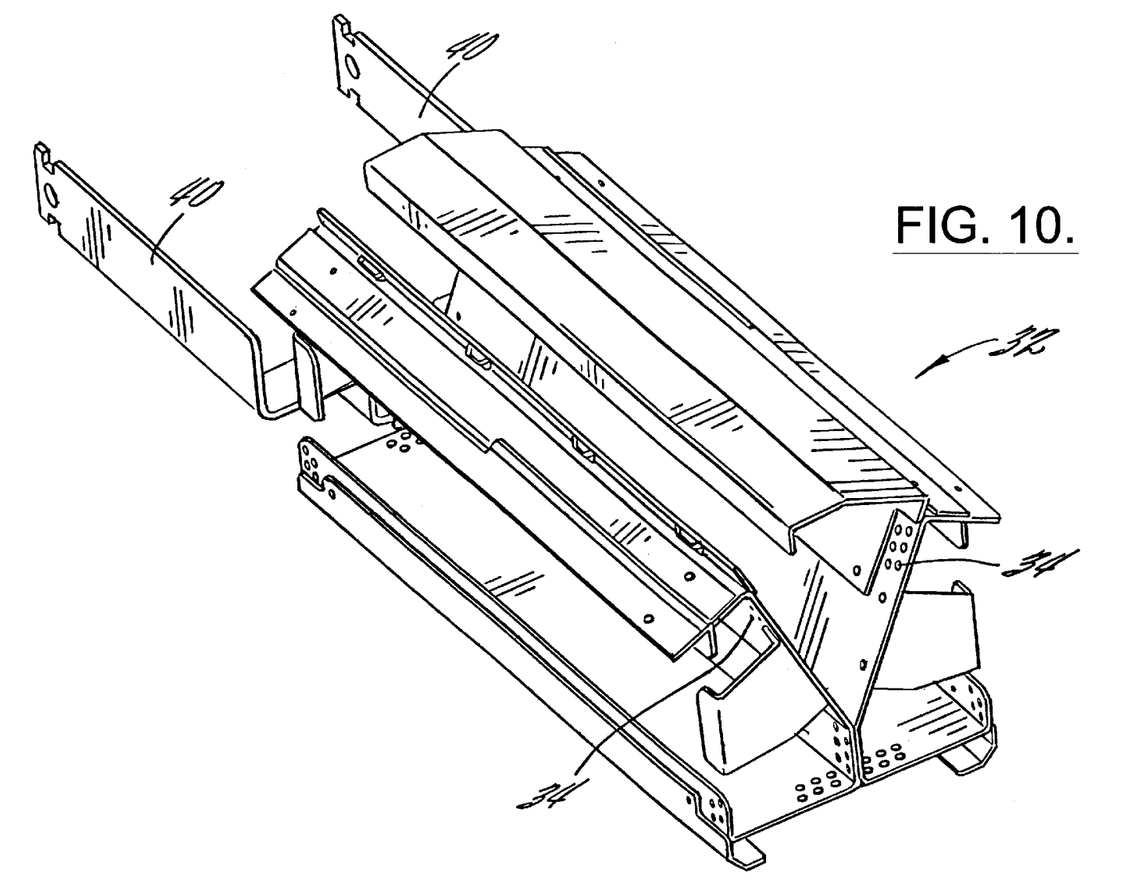
FIG. 10 is a perspective view of a fiber management frame according to another embodiment of the closure of the present invention.

Although one advantageous embodiment of the fiber management frame 32 has been described above, the fiber management frame can have other configurations without departing from the spirit and scope of the present invention. For example, the fiber management frame can be generally Y-shaped in lateral cross-section as shown in FIG. 10. In addition, the closure 10 of the present invention can have a variety of sizes depending upon the number of optical fibers to be interconnected therein. For example, the closure can have a six-inch lateral cross-sectional diameter, an eight-inch lateral cross-sectional diameter or any other size that is desired.

In order to further organize the optical fibers within the closure 10 and, in particular, the express fibers within the first slack storage compartment 36a, the closure of the present invention can include one or more dividers 68 that extend lengthwise through the first slack storage compartment for dividing the first slack storage compartment into a plurality of sub-compartments. See FIG. 7. Although the dividers can be utilized with closures of any size, the dividers are generally most useful in conjunction with the larger closures which facilitate interconnection of a large number of optical fibers. In this embodiment, the cover 62 for the first slack storage compartment can define one or more slits 70 for receiving tabs 72 extending outwardly from respective dividers. The engagement of the tab within a corresponding slit defined by the cover serves to mechanically support the divider. In addition, the tabs can be labeled so as to identify the particular type of express fibers in the various sub-compartments of the first slack storage compartment.

The closure 10 of the present invention therefore facilitates the organization and management of a plurality of optical fibers, some of which are express fibers and others of which are to be interconnected within the closure. As described, the closure of the present invention facilitates not only the original configuration of the optical fibers, but also the subsequent reconfiguration of the optical fibers within the various compartments 36, 38 in such a manner that respective ones of the optical fibers can be more readily identified and accessed than in conventional closures. In addition, the closure of the present invention has fewer parts and, in particular, fewer moving parts than conventional closures that include a plurality of splice trays, thereby generally reducing the complexity of the closure and the time required to assemble the closure of the present invention in comparison to conventional closures.

While the closure 10 of the present invention is useful for splicing a variety of different types of optical fibers, the closure of the present invention is particularly well-suited for organizing and splicing ribbon fiber. In particular, the various slack storage compartments 36 defined by the closure of the present invention permit the slack lengths of the ribbon fiber to be coiled in an organized manner, while also permitting end portions of the ribbon fiber to be readily interconnected and stored within the fiber interconnection compartment 38.

As described heretofore, the closure 10 of one advantageous embodiment includes a fiber management frame 32 which defines a plurality of slack storage compartments 36 and a fiber interconnection compartment 38 which are independent of splice trays. In other words, the closure of this advantageous embodiment need not include any splice trays in order to make the requisite interconnections, such as splice connections between pairs of ribbon fibers. Among other reasons, the closure of one advantageous embodiment of the present invention which encloses a number of spliced connections between ribbon fibers need not include splice trays since the spliced connections between ribbon fibers are significantly fewer in number and occupy significantly less space than spliced connections between the same number of loose or individual optical fibers.

Figure 9:
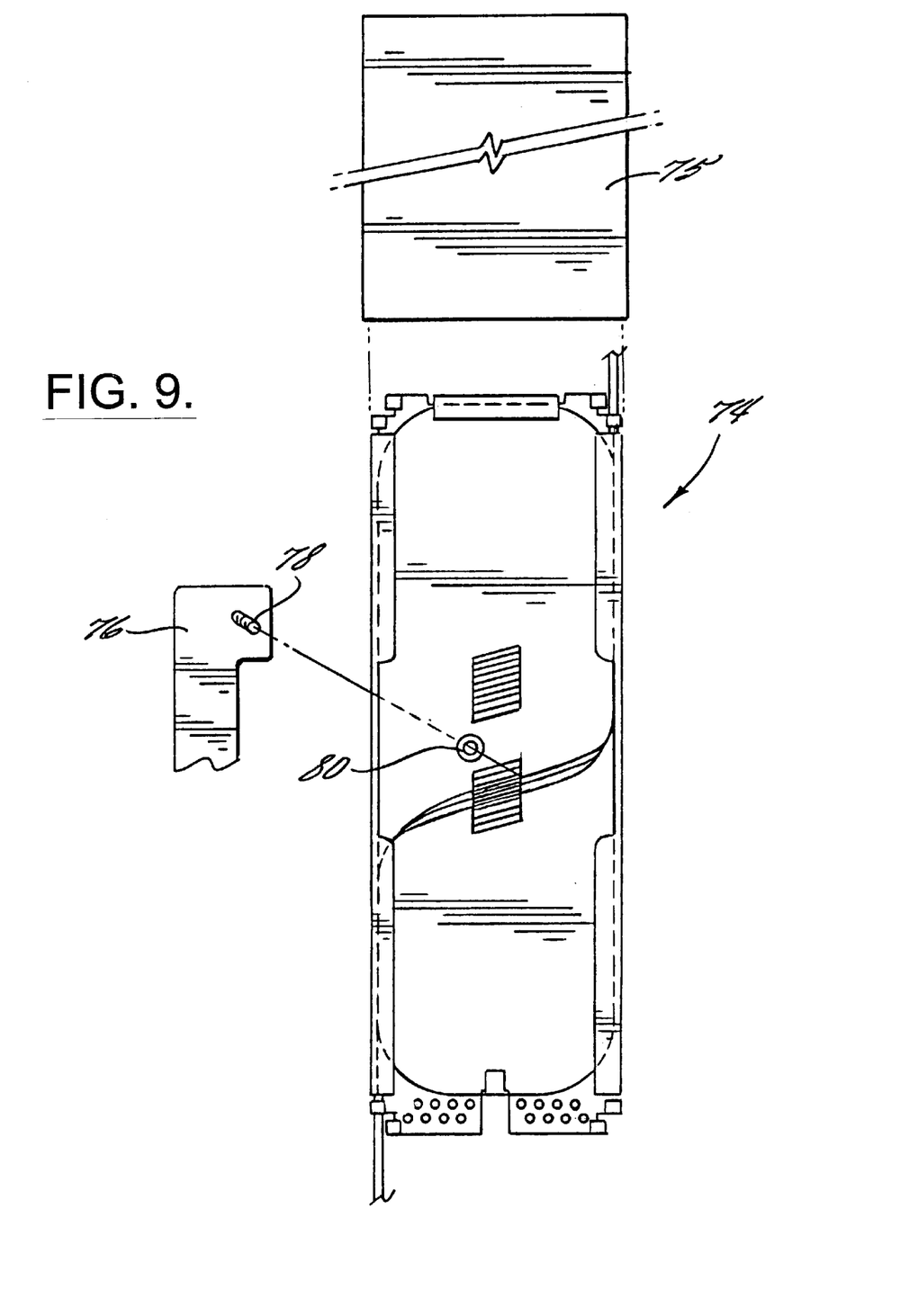
FIG. 9 is an exploded view of a splice tray and a portion of a fiber management frame according to one embodiment of the closure of the present invention.

In some embodiments, however, it is desirable to not only permit interconnections between ribbon fibers, but to also permit splice connections between individual optical fibers. In this regard, the closure 10 of one embodiment can include one or more splice trays 74. In the embodiment illustrated in FIG. 1, for example, the fiber management frame 32 can include a mount, such as an arm 76 that includes an outwardly extending projection 78 for engaging a respective splice tray. Correspondingly, the splice trays of this embodiment can define respective apertures 80 as shown in FIG. 9 in which the cover 75 of the splice tray has been exploded for purposes of illustration. By mounting the splice trays to the fiber management frame such that the outwardly extending projection extends through the corresponding aperture of a splice tray, splice trays can be mounted to the fiber management frame. Within the splice tray, individual optical fibers can be spliced as shown in FIG. 9. For example, a ribbon fiber of one of the fiber optic feeder cables 26 can be separated into individual optical fibers which are then spliced to respective ones of the optical fibers of a fiber optic distribution cable 30. Therefore, the closure of this embodiment of the present invention further increases the versatility of the closure and the variety of interconnections which can be made therein. In addition, although the fiber interconnection compartment 38 of the closure 10 has been described heretofore as including a splice holder 50, the fiber interconnection compartment can instead include a splice tray without departing from the spirit and scope of the present invention.

In the drawings and the specification, there has been set forth a preferred embodiment of the invention and, although specific terms are employed, the terms are used in a generic and descriptive sense only and not for purpose of limitation, the scope of the invention being set forth in the following claims.

That which is claimed is:

1. A closure for facilitating interconnection of respective optical fibers of first and second fiber optic cables, the closure comprising:

a housing defining an internal cavity; and a fiber management frame disposed within the internal cavity, said fiber management frame comprising a plurality of partitions for dividing the internal cavity into at least first and second slack storage compartments and a fiber interconnection compartment, wherein the first slack storage compartment is adapted to store slack lengths of unspliced express optical fibers, wherein the second slack storage compartment is adapted to store slack lengths of the optical fibers that are interconnected within the closure, and wherein the fiber interconnection compartment is adapted to receive end portions of optical fibers from the second slack storage compartment such that the optical fibers can be interconnected therein.

2. A closure according to claim 1 wherein said partitions of said fiber management frame further divide the internal cavity into a third slack storage compartment adapted to store slack lengths of the optical fibers that are interconnected within the closure, and wherein the fiber interconnection compartment is adapted to receive end portions of optical fibers from the second and third slack storage compartments such that respective ones of the optical fibers from the second and third slack storage compartments can be interconnected therein.

3. A closure according to claim 2 wherein the first, second and third slack storage compartments are each adapted to store slack lengths of the optical fibers in a coiled configuration to thereby define a respective slack storage plane extending generally parallel to the slack lengths of the optical fibers, and wherein the slack storage planes of the first, second and third slack storage compartments are parallel.

4. A closure according to claim 2 wherein the first slack storage compartment that is adapted to store slack lengths of the unspliced express optical fibers is positioned between the second and third slack storage compartments that are adapted to store slack lengths of the optical fibers that are spliced within the closure.

5. A closure according to claim 1 further comprising a splice holder disposed within the fiber interconnection compartment for retaining spliced end portions of the optical fibers.

6. A closure according to claim 5 wherein the first and second slack storage compartments are each adapted to store slack lengths of the optical fibers in a coiled configuration to thereby define a respective slack storage plane extending generally parallel to the slack lengths of the optical fibers, and wherein said splice holder defines a splice plane extending generally parallel to the spliced end portions of the optical fibers, the splice plane of said splice holder also extending perpendicular to the slack storage planes of the first and second slack storage compartments.

7. A closure according to claim 1 wherein said partition of said fiber management frame which separates the first and second slack storage compartments defines a window for permitting optical fibers to pass from the first slack storage compartment to the second slack storage compartment.

8. A closure according to claim 1 further comprising at least one divider for separating the first slack storage compartment into a plurality of subcompartments that are each adapted to store slack lengths of unspliced express optical fibers.

9. A closure according to claim 1 wherein said fiber management frame further comprises a mount, and wherein the closure further comprises a splice tray secured to said mount.

10. A closure according to claim 1 wherein said fiber interconnection compartment is adapted to receive end portions of ribbon fibers such that pairs of the ribbon fibers can be interconnected therein.

11. A closure according to claim 1 wherein said fiber interconnection compartment is adapted to receive end portions of individual optical fibers such that pairs of the optical fibers can be interconnected therein.

12. A closure for facilitating splicing of respective optical fibers of first and second fiber optic cables, the closure comprising:
a housing defining an internal cavity;
a fiber management frame disposed within the internal cavity, said fiber management frame comprising a plurality of partitions for dividing the internal cavity into a slack storage compartment and a splice compartment, wherein the slack storage compartment is adapted to store slack lengths of the optical fibers in a coiled configuration that defines a slack storage plane extending generally parallel to the slack lengths of the optical fibers, and wherein the splice compartment is adapted to receive end portions of optical fibers from the slack storage compartment such that the optical fibers can be spliced therein; and
a splice holder disposed within the splice compartment for retaining the spliced end portions of the optical fibers, said splice holder defining a splice plane extending generally parallel to the spliced end portions of the optical fibers, the splice plane of said splice holder also extending perpendicular to the slack storage plane.

13. A closure according to claim 12 wherein said partitions of said fiber management frame further divide the internal cavity into a first slack storage compartment for storing slack lengths of unspliced express optical fibers and a second slack storage compartment for storing slack lengths of the optical fibers that are spliced within the splice compartment of the closure.

14. A closure according to claim 13 wherein said partitions of said fiber management frame further divide the internal cavity into a third slack storage compartment for storing slack lengths of the optical fibers that are spliced within the splice compartment of the closure, and wherein the splice compartment is adapted to receive end portions of optical fibers from the second and third slack storage compartments such that respective ones of the optical fibers from the second and third slack storage compartments can be spliced therein.

15. A closure according to claim 14 wherein the first, second and third slack storage compartments are each adapted to store slack lengths of the optical fibers in a coiled configuration to thereby define a respective slack storage plane extending generally parallel to the slack lengths of the optical fibers, and wherein the slack storage planes of the first, second and third slack storage compartments are parallel.

16. A closure according to claim 14 wherein the first slack storage compartment that is adapted to store slack lengths of the unspliced express optical fibers is positioned between the second and third slack storage compartments that are adapted to store slack lengths of the optical fibers that are spliced within the closure.

17. A closure according to claim 13 wherein said partition of said fiber management frame which separates the first and second slack storage compartments defines a window for permitting optical fibers to pass from the first slack storage compartment to the second slack storage compartment.

18. A closure according to claim 13 further comprising at least one divider for separating the first slack storage compartment into a plurality of subcompartments that are each adapted to store slack lengths of unspliced express optical fibers.

19. A closure according to claim 12 wherein said fiber management frame further comprises a mount, and wherein the closure further comprises a splice tray secured to said mount.

20. A closure according to claim 12 wherein said splice holder is adapted to retain the spliced end portions of ribbon fibers.

21. A closure according to claim 12 wherein said splice compartment is adapted to retain the spliced end portions of individual optical fibers.

22. A closure for facilitating interconnection of respective optical fibers of first and second fiber optic cables, the closure comprising:

a housing defining an internal cavity; and a fiber management frame disposed within the internal cavity, said fiber management frame comprising a plurality of partitions for dividing the internal cavity into a plurality of slack storage compartments and a fiber interconnection compartment, wherein each slack storage compartment is adapted to store slack lengths of the optical fibers, wherein the fiber interconnection compartment is adapted to receive end portions of optical fibers from the slack storage compartments such that the optical fibers can be interconnected therein, and wherein the plurality of slack storage compartments and the fiber interconnection compartment are independent of splice trays.

23. A closure according to claim 22 wherein the plurality of slack storage compartments comprise a first slack storage compartment for storing slack lengths of unspliced express optical fibers and a second slack storage compartment for storing slack lengths of the optical fibers that are interconnected within the fiber interconnection compartment of the closure.

24. A closure according to claim 23 wherein the plurality of slack storage compartments further comprise a third slack storage compartment for storing slack lengths of the optical fibers that are spliced within the fiber interconnection compartment of the closure, and wherein the fiber interconnection compartment is adapted to receive end portions of optical fibers from the second and third slack storage compartments such that respective ones of the optical fibers from the second and third slack storage compartments can be interconnected therein.

25. A closure according to claim 24 wherein the first, second and third slack storage compartments are each adapted to store slack lengths of the optical fibers in a coiled configuration to thereby define a respective slack storage plane extending generally parallel to the slack lengths of the optical fibers, and wherein the slack storage planes of the first, second and third slack storage compartments are parallel.

26. A closure according to claim 24 wherein the first slack storage compartment that is adapted to store slack lengths of the unspliced express optical fibers is positioned between the second and third slack storage compartments that are adapted to store slack lengths of the optical fibers that are spliced within the closure.

27. A closure according to claim 23 wherein said partition of said fiber management frame which separates the first and second slack storage compartments defines a window for permitting optical fibers to pass from the first slack storage compartment to the second slack storage compartment.

28. A closure according to claim 23 further comprising at least one divider for separating the first slack storage compartment into a plurality of subcompartments that are each adapted to store slack lengths of unspliced express optical fibers.

29. A closure according to claim 22 further comprising a splice holder disposed within the fiber interconnection compartment for retaining spliced end portions of the optical fibers.

30. A closure according to claim 29 wherein the plurality of slack storage compartments are each adapted to store slack lengths of the optical fibers in a coiled configuration to thereby define a respective slack storage plane extending generally parallel to the slack lengths of the optical fibers, and wherein said splice holder defines a splice plane extending generally parallel to the spliced end portions of the optical fibers, the splice plane of said splice holder also extending perpendicular to the slack storage planes of the plurality of slack storage compartments.

31. A closure according to claim 22 wherein said fiber interconnection compartment is adapted to receive end portions of ribbon fibers such that pairs of the ribbon fibers can be interconnected therein.

32. A closure according to claim 22 wherein said fiber interconnection compartment is adapted to receive end portions of individual optical fibers such that pairs of the optical fibers can be fiber interconnected therein.

* * * * *